United States Patent [19]
Fransson et al.

[11] 4,325,189
[45] Apr. 20, 1982

[54] METHOD AND APPARATUS FOR CHECKING A GEAR

[75] Inventors: George E. Fransson; Stuart J. Johnson; Edward W. Haug, all of Rockford, Ill.

[73] Assignee: Barber-Colman Company, Rockford, Ill.

[21] Appl. No.: 153,599

[22] Filed: May 27, 1980

[51] Int. Cl.³ .................... G01B 5/14; G01M 13/02
[52] U.S. Cl. .................................. 33/179.5 B; 73/162
[58] Field of Search ............... 73/162; 33/179.5 E, 33/179.5 B, 179.5 C, 179.5 R, 179.5 D; 409/2

[56] References Cited

U.S. PATENT DOCUMENTS

| | | | |
|---|---|---|---|
| 2,422,034 | 6/1947 | Mustonen | 33/179.5 B X |
| 3,064,809 | 11/1962 | Anthony et al. | 73/162 X |
| 3,224,146 | 12/1965 | Ahlström | 51/90 |
| 3,841,198 | 10/1974 | Comford | 409/2 |
| 3,851,398 | 12/1974 | Hilburger | 73/162 X |
| 3,956,929 | 5/1976 | Jenkins et al. | 73/162 X |
| 4,169,691 | 10/1979 | Flair | 33/179.5 X |

*Primary Examiner*—Daniel M. Yasich
*Attorney, Agent, or Firm*—Leydig, Voit, Osann, Mayer & Holt, Ltd.

[57] ABSTRACT

A newly formed gear is checked for composite error by holding the gear in a rotationally stationary position and by orbiting and rolling a master gear around the newly formed gear.

11 Claims, 5 Drawing Figures

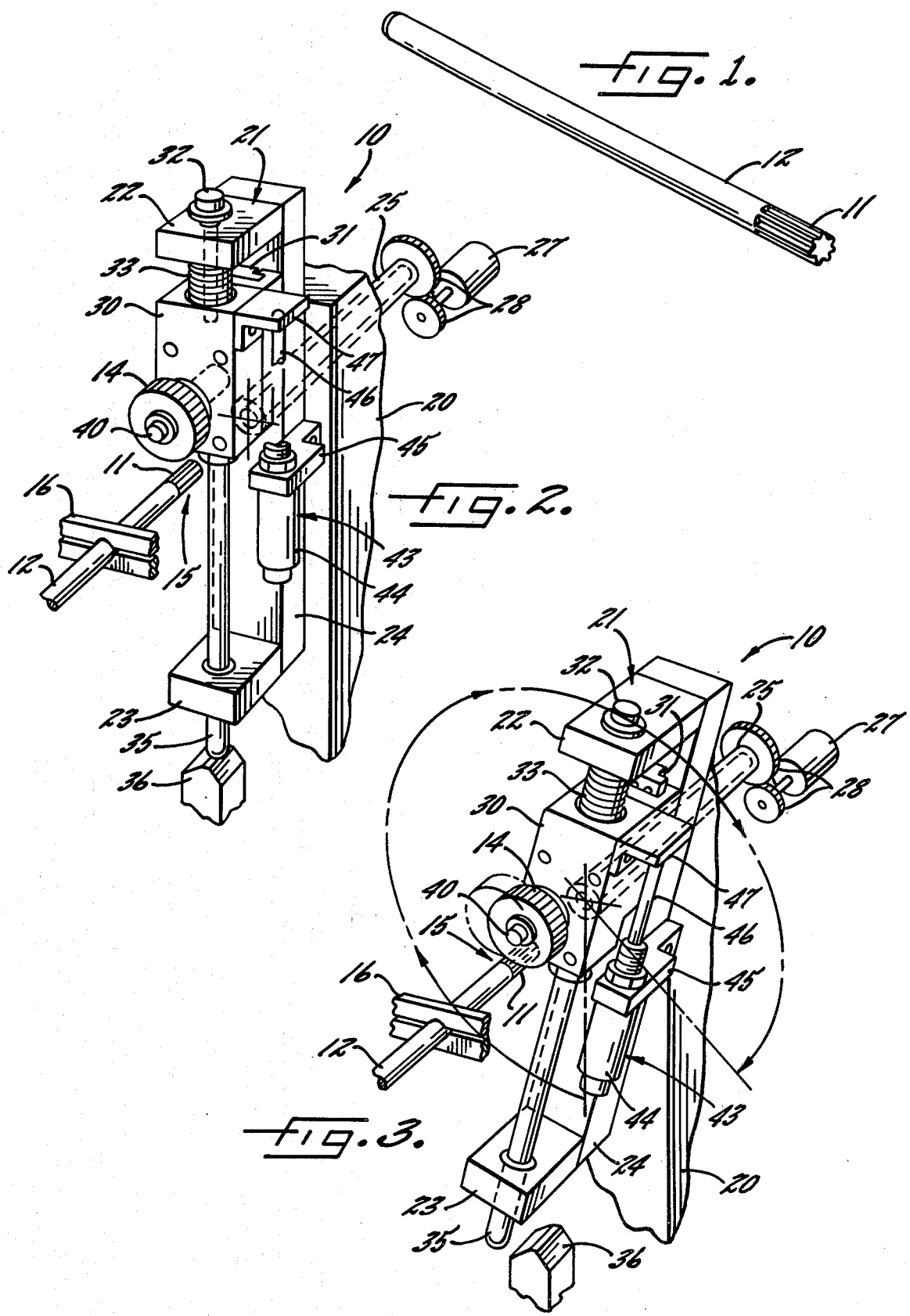

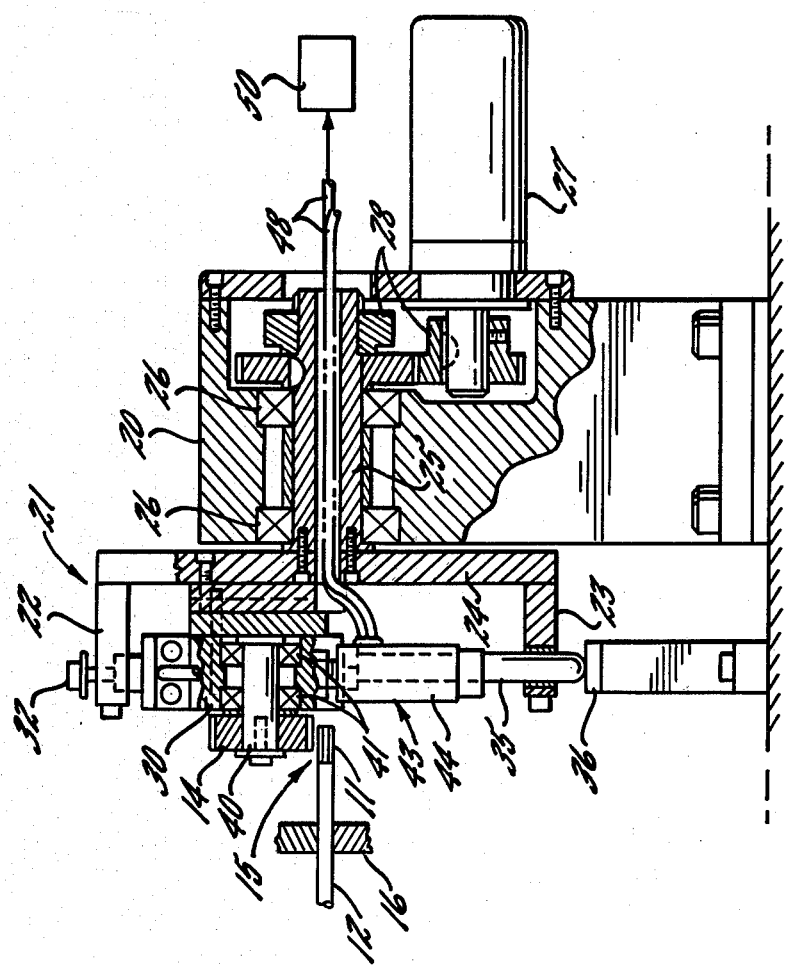
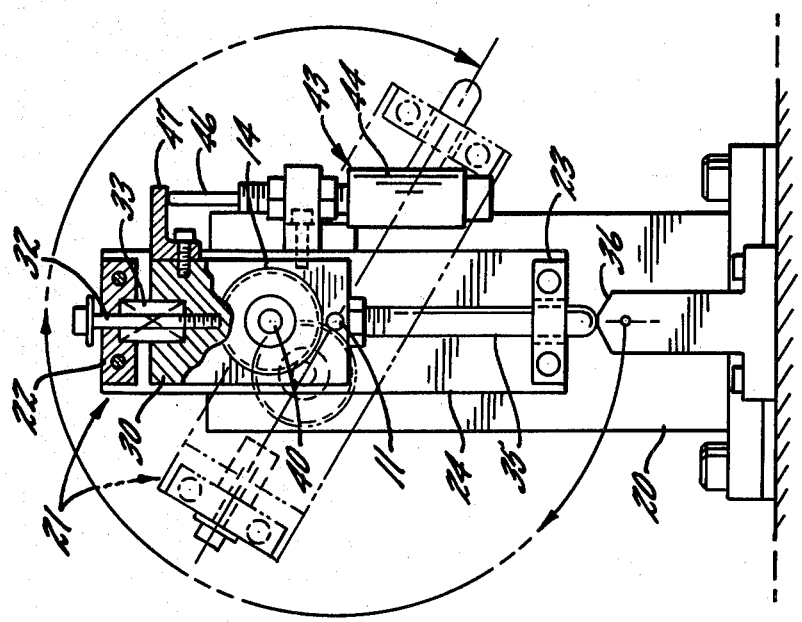

METHOD AND APPARATUS FOR CHECKING A GEAR

BACKGROUND OF THE INVENTION

This invention relates to method and apparatus for checking the accuracy of a newly formed rotary gear with a master rotary gear. The invention more particularly relates to apparatus in which the accuracy of the newly formed gear is checked by detecting variations in the distance between the axes of the two gears while the gears are in meshing engagement.

SUMMARY OF THE INVENTION

The general aim of the present invention is to check the newly formed gear in a unique manner which enables extremely simple handling of the gear during the checking operation.

A more detailed object of the invention is to achieve the foregoing by checking the newly formed gear while holding the latter in a rotationally stationary position and while orbiting and rolling a master gear around the newly formed gear.

The invention also resides in the relatively simple construction of the gear checking apparatus and in the novel orbiting of the master gear first in one direction and then the other.

These and other objects and advantages of the invention will become more apparent from the following detailed description when taken in conjunction with the accompanying drawings.

BRIEF DESCRIPTION OF THE DRAWINGS

FIG. 1 is a perspective view of a typical gear which is adapted to be checked by method and apparatus incorporating the unique principles of the present invention.

FIG. 2 is a fragmentary perspective view of the gear checking apparatus.

FIG. 3 is a view similar to FIG. 2 but shows certain parts of the apparatus in moved positions.

FIGS. 4 and 5 are front and side elevational views, respectively, of the gear checking apparatus, certain parts being broken away and shown in section.

DETAILED DESCRIPTION OF THE PREFERRED EMBODIMENT

As shown in the drawings for purposes of illustration, the invention is embodied in apparatus 10 for checking the accuracy of a newly formed gear 11 which sometimes hereinafter will be referred to as being a sample gear. In the present instance, the gear 11 is a straight spur gear or gear-type spline and is formed on one end portion of a cylindrical shaft 12 of relatively small diameter (e.g., ¼ inch). The outside diameter of the gear is approximately the same as the diameter of the shaft. A shaft of this type is commonly used as the drive shaft of a small electric motor.

The gear 11 is preferably but not necessarily formed on the shaft 12 by one of the machines disclosed in our co-pending application Ser. No. 041,680, filed May 23, 1979, entitled Shape Generation By Orbiting A Rotating Cutter and assigned to the assignee of the present invention. Reference may be had to that application for a detailed disclosure of the method and apparatus for forming the gear. The apparatus is capable of forming the gears at a rate of about six per minute.

Each newly formed gear 11 must be checked for composite error to make certain that it meets designated standards. Specifically, it is necessary to make certain that the teeth of the gear are formed such that, when the gear is ultimately placed in meshing engagement with a mating gear, the runout or variation in the radial distance between the axes of the two gears is within a certain range as the gears are rotated. In order to check the runout, the present apparatus 10 utilizes a so-called master gear 14 which is a facsimile of the actual gear with which the gear 11 will mate when the latter is placed in service use.

In accordance with the present invention, checking of the sample gear 11 is effected by holding that gear rotationally stationary in a gear checking station 15 while causing the master gear 14 to orbit and roll around the sample gear. As a result of checking the sample gear in this manner, relatively simple apparatus can be employed for advancing the sample gear into and out of the checking station and for holding the sample gear in the checking station. In addition, the checking apparatus 10 itself is of comparatively simple construction.

Various types of apparatus such as an endless conveyor, a rotary index table or a walking beam may be used for transferring sample gears 11 successively into and out of the checking station 15. Each sample gear advanced into the checking station dwells momentarily therein during the checking operation and is held in a stationary position by a clamping device which either may be located in the checking station or associated with the transfer apparatus. One type of clamping device has been shown schematically in the drawings and is indicated by the reference numeral 16.

The gear checking apparatus 10 includes a stationary support or housing 20. Rotatably supported by the housing is a head 21 which is formed by a generally C-shaped yoke having upper and lower arms 22 and 23 fastened to the upper and lower ends of an upright plate 24. A hollow shaft 25 (FIG. 5) is secured to and extends rearwardly from the plate and is journaled in the housing 20 by a pair of bearings 26. The axis of the shaft 25 is alined axially with the center axis of the sample gear 11 dwelling in the checking station 15. The head 21 is adapted to be turned about the axis of the shaft 25 by a reversible electric motor 27 secured to the rear of the housing and connected to the shaft by gearing 28 which is located within the housing.

A carriage 30 is mounted on the head 21 to move back and forth thereon along a path extending perpendicular to the axis of the shaft 25. Herein, the carriage comprises a block-like member which is supported on the plate 24 of the head by an anti-friction slide 31 (FIG. 2). Threaded into the carriage 30 is a screw 32 which extends slidably through the arm 22 of the head 21. A coil spring 33 is telescoped over the screw and is compressed between the arm 22 and the carriage 30 to bias the carriage away from the arm.

Secured rigidly to one end of the carriage 30 is a stem 35 which is slidably guided by the arm 23 of the head 21. For a purpose to be explained subsequently, the free end of the stem is adapted to engage the downwardly inclined surface of a cam 36 which is located in a stationary position in the checking station 15.

The master gear 14 is secured rigidly to a shaft 40 which is journaled for free rotation relative to the carriage 30 by a pair of bearings 41 (FIG. 5) supported by the carriage. The axis of the shaft 40 extends parallel to and is offset radially from the axes of the sample gear 11 and the head 21 and thus the master gear 14 is located eccentrically with respect to the sample gear.

The gear checking apparatus 10 is completed by means for indicating the radial distance between the axes of the sample gear 11 and the master gear 14. While the indicating means may take various forms, a linear variable differential transformer (LVDT) 43 of conventional construction is used in the present instance. Such a transformer comprises a first part or electrical coil 44 which is secured rigidly to the plate 24 of the head 21 by a bracket 45 (FIG. 2). A second part in the form of a plunger 46 (FIG. 4) is telescoped slidably into the coil and is resiliently biased into engagement with a stop 47 which is secured rigidly to the carriage 30. Two electrical conductors 48 (FIG. 5) are connected to the coil 44 and extend through the hollow shaft 25 of the head 21 along the rotational axis thereof.

When the coil 44 is energized by current supplied from a voltage source (not shown), movement of the plunger 46 relative to the coil causes the latter to produce an electrical signal whose magnitude varies linearly as a function of the displacement of the plunger. The signal is routed by way of one of the conductors 48 to a signal receiving means 50 which has been shown schematically in FIG. 5.

OPERATION

Each time a sample gear 11 is advanced into the checking station 15, the checking apparatus 10 is positioned as shown in FIGS. 2 and 5 and in full lines in FIG. 4. The head 21 is located in an upright position and is oriented such that the stem 35 of the carriage 30 is in engagement with the cam 36. As a result, the carriage 30 is forced upwardly relative to the head 21 and against the bias of the spring 33. The master gear 14 thus is held upwardly out of engagement with the sample gear 11.

To initiate a checking cycle, the motor 27 is energized to rotate the head 21 in a clockwise direction. During initial rotation of the head, the stem 35 rides off of the cam 36 to allow the spring 33 to shift the carriage 30 downwardly (see FIG. 3). Accordingly, the master gear 14 moves bodily downwardly into engagement with the sample gear 11 and orbits clockwise around the sample gear. When the master gear first shifts downwardly, it may not mesh immediately with the sample gear. The master gear, however, rotates freely about the axis of the shaft 40 and thus very quickly turns to a position in which its teeth mesh with those of the sample gear. Hence, the master gear rolls and orbits around the sample gear as the head 21 is rotated.

Clockwise rotation of the head 21 is continued until the head has been turned through an angle of about 300 degrees as shown in broken lines in FIG. 4. During clockwise rotation of the head, the output signal from the LVDT 43 is not monitored and thus no checking operation is performed. The head is rotated clockwise primarily in order to bring the master gear 14 into true rolling engagement with the sample gear 11 and to position the parts preparatory to the actual checking operation.

After the head 21 has been rotated clockwise through about 300 degrees to the position shown in broken lines in FIG. 4, the motor 27 is automatically reversed and begins rotating the head in a counterclockwise direction. During such rotation, the output signal from the LVDT 43 is monitored by the signal receiving means 50.

As the head 21 rotates counterclockwise, the master gear 14 again orbits and rolls around the sample gear 11. Any variation in the radial distance between the axes of the two gears causes the carriage 30 to shift on the head 21. In other words, the carriage is forced in one direction against the spring 33 if the radial distance between the two gears increases as the master gear orbits and is pressed in the reverse direction by the spring if the radial distance decreases. Such shifting movement of the carriage causes movement of the plunger 46 of the LVDT 43 relative to the coil 44 thereof so that the output signal of the LVDT is indicative of the runout between the two gears. If the runout as detected by the LVDT is not within an acceptable range, the signal receiving means 50 produces an output signal which causes the gear 11 to be rejected at a station downstream from the checking station 15.

As the head 21 completes 300 degrees of counterclockwise rotation, the stem 35 encounters and rides upwardly on the cam 36. The cam thus forces the carriage 30 upwardly to shift the master gear 14 out of engagement with the sample gear 11. The latter gear then is indexed out of the checking station 15 while a succeeding sample gear is indexed into the station preparatory to the next checking cycle.

From the foregoing, it will be apparent that the present invention brings to the art new and improved apparatus 10 which is capable of checking a newly formed gear 11 without need of rotating or otherwise moving the gear during the checking operation. As a result, handling of the sample gear 11 in the checking station 15 is simplified. Moreover, the gear checking apparatus 10 is of relatively simple construction and, since the head 21 is rotated first in one direction and then the other, the conductors 48 for the LVDT 43 are never twisted through a full turn. Accordingly, there is no need of using slip rings or the like to conduct current to and from the LVDT as otherwise would be the case if the head were continuously turned in one direction. If desired, a slip ring connection to the LVDT could be provided. In such an instance, the head could be rotated unidirectionally through a full turn during each checking cycle with a consequent saving of time.

We claim:

1. Apparatus for checking a sample gear having a central axis, said apparatus comprising means for holding said gear rotationally stationary in a checking station, a support, a head mounted on said support to rotate about an axis alined axially with the axis of said gear, a carriage mounted on said head to rotate therewith and to move back and forth on said head along a path extending perpendicular to the rotational axis thereof, a master gear mounted on said carriage to rotate about an axis extending parallel to and offset radially from the axis of said sample gear, means for bringing said master gear and said sample gear into engagement and for turning said head about its rotational axis to cause said master gear to orbit and roll around said sample gear, and means responsive to the movement of said carriage along said path for indicating the radial distance between the axes of said gears during rotation of said head.

2. Apparatus for checking a sample gear having a central axis, said apparatus comprising means for holding said gear in a stationary position in a checking station, a support, a head mounted on said support to rotate about an axis alined axially with the axis of said gear, a carriage mounted on said head to rotate therewith and to move back and forth on said head along a path extending perpendicular to the rotational axis thereof, a master gear mounted on said carriage to rotate about an axis extending parallel to and offset radially from the axis of said sample gear, means for turning said head about its rotational axis to cause said master gear to orbit around said sample gear, means for shifting said carriage on said head in a direction to bring said master gear into engagement with said sample gear, means for indicating the radial distance between the axes of said gears during rotation of said head and as said master gear orbits and rolls around said sample gear, and means for shifting said carriage on said head in a direction to retract said master gear out of engagement with said sample gear.

3. Apparatus as defined in claim 2 in which said means for shifting said carriage in a direction to bring said master gear into engagement with said sample gear comprise resiliently yieldable means acting between said head and said carriage and biasing said master gear toward said sample gear.

4. Apparatus as defined in either of claims 2 or 3 in which said means for shifting said head on said carriage in a direction to retract said master gear out of engagement with said sample gear comprises a stationary cam which engages said carriage when the latter is rotated to a predetermined angular position.

5. Apparatus as defined in claim 2 in which said indicating means include first and second relatively movable parts, said first part being rigidly secured to said head, and said second part moving relative to said first part in response to movement of said carriage along said path.

6. Apparatus as defined in claim 5 in which said indicating means produce an electrical signal representative of the radial distance between the axes of said gears, an electrical conductor connected to and extending from said first part and adapted to be connected to signal receiving means, said conductor extending between said first part and said signal receiving means along a line substantially coinciding with the rotational axis of said head, said turning means rotating said head in one direction through an angle of less than 360 degrees and then rotating said head reversely through said angle each time a sample gear is checked.

7. Apparatus as defined in claim 2 in which said turning means rotate said head through a predetermined angle in one direction and then in the reverse direction each time a sample gear is checked.

8. Apparatus as defined in claim 7 in which said angle is less than 360 degrees.

9. A method of checking a sample gear having a central axis, said method comprising the steps of, holding said gear in a rotationally stationary position, orbiting a carriage means mounting a rotatable master gear around the axis of said sample gear, moving said master gear radially into engagement with said sample gear, holding said master gear in rolling engagement with said sample gear but allowing said master gear to shift radially relative to said sample gear while said master gear orbits around said sample gear, and detecting the radial displacement of said master gear as the latter orbits and rolls around said stationary gear.

10. A method as defined in claim 9 further including the steps of bodily moving said master gear radially into engagement with said sample gear after said master gear starts orbiting, and bodily moving said master gear out of engagement with said sample gear before said master gear stops orbiting.

11. A method as defined in claim 9 further including the steps of orbiting said master gear around said sample gear first in one direction and then the other, bodily moving said master gear radially into engagement with said sample gear as said master gear orbits in said one direction, and bodily moving said master gear radially out of engagement with said sample gear when said master gear orbits in the other direction.

* * * * *